United States Patent [11] 3,607,279

[72] Inventor Nicholas Gold
      Arlington, Mass.
[21] Appl. No. 784,159
[22] Filed Dec. 16, 1968
[45] Patented Sept. 21, 1971
[73] Assignee Polaroid Corporation
      Cambridge, Mass.

[54] PHOTOGRAPHIC FILM ASSEMBLAGE
     8 Claims, 4 Drawing Figs.
[52] U.S. Cl. .................................................. 96/76,
                                            95/13, 95/19, 95/67
[51] Int. Cl. ........................................... G03b 17/26,
                                                       G03c 3/00
[50] Field of Search .......................................... 96/3, 76,
                                                   29; 95/13, 19, 67

[56]                 References Cited
                UNITED STATES PATENTS
1,933,823  11/1933  Nagel .......................... 95/66
2,978,971   4/1961  Eburn .......................... 95/13
3,309,201   3/1967  Friedman ...................... 96/3
3,405,618  11/1968  Land ........................... 95/13
3,426,664   2/1969  Norton ......................... 95/13

Primary Examiner—William D. Martin
Assistant Examiner—William R. Trenor
Attorneys—Brown and Mikulka, Robert E. Corb and Alfred E. Corrigan ABSTRACT: A photographic film assemblage including a container having a forward wall with a light-transmitting section therein and an end wall which cooperates with the forward wall to define a withdrawal opening. A plurality of film units are stacked within the container with their photosensitive surfaces facing the light-transmitting section and with one of their ends positioned adjacent the end wall. A dark slide, movable through the withdrawal opening and comprised of a rigid member and a flexible skirt, is provided to prevent the admission of actinic light through the light-transmitting section and the withdrawal opening, respectively.

PATENTED SEP 21 1971

INVENTOR.
NICHOLAS GOLD

BY Brown and Mikulka
and
Alfred E. Corrigan
ATTORNEYS

INVENTOR.
NICHOLAS GOLD

PHOTOGRAPHIC FILM ASSEMBLAGE

The present invention is concerned with improvements in photographic film assemblage or packs of the type including a container and a plurality of photosensitive elements or film units adapted to be exposed, in sequence, with the container and withdrawn therefrom following exposure. The container is provided with an elongated opening in one end thereof dimensioned to permit the passage of the film units therethrough and a forward wall having a light-transmitting section. The film units are stacked within the container with the leading end of each film unit positioned adjacent an end wall and with a forwardmost film unit positioned with its photosensitive surface facing in the direction of said forward wall in position for exposure to light transmitted through the light-transmitting section and its leading end in alignment with the elongated opening.

Support means are provided for supporting the film unit farthest from the light-transmitting section and for urging the film units toward the light-transmitting section. Prior to the film assemblage being positioned within a camera, the abovementioned opening and light-transmitting section must be covered to prevent any actinic light passing therethrough and exposing a film unit.

An object of the invention is to provide, in a photographic film assemblage of the type set forth above, a container having a simple, inexpensive and effective means for preventing exposure of a film unit located within the container, to actinic light admitted to the interior of the container by the opening and light-transmitting section.

Another object of the invention is to provide in a film assemblage of the foregoing type including a container having a forward wall with a light-transmitting section and an elongated opening in one end thereof, a plurality of film units stacked therein and a shield for preventing the passage of actinic light through the light-transmitting section and opening, means associated with the shield for facilitating the withdrawal of the shield from the container via the opening.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
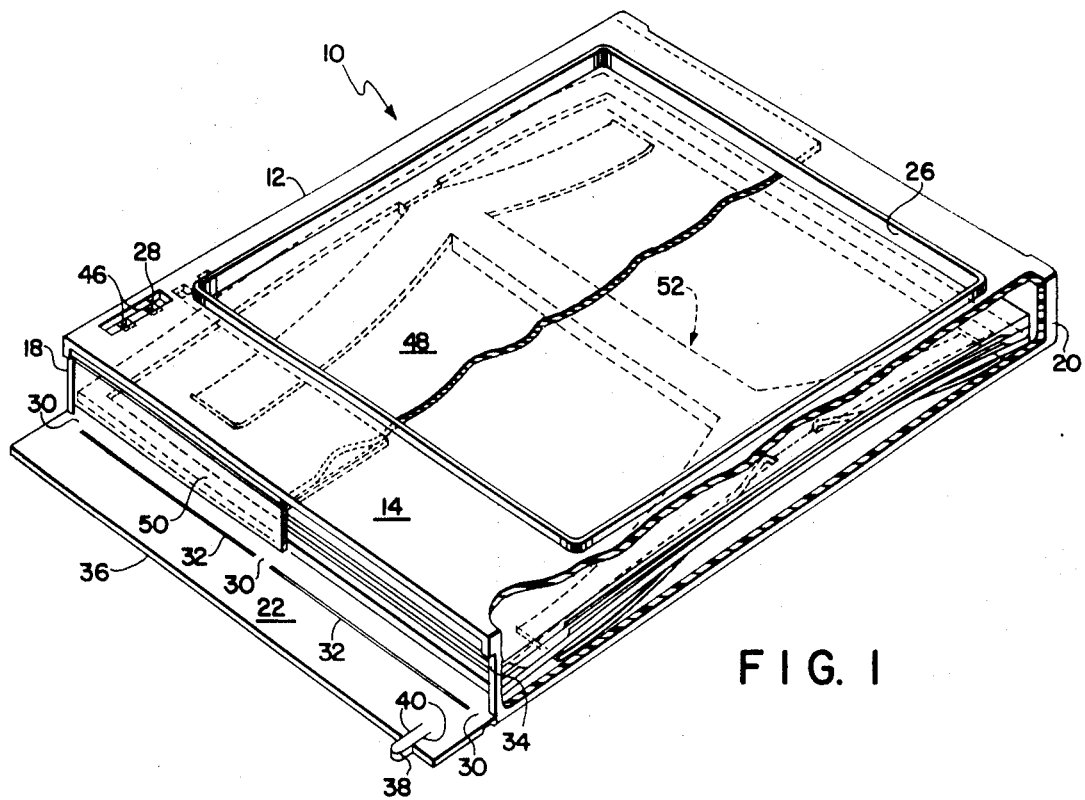
FIG. 1 is a perspective view, partly in section, of the film assemblage of the instant invention.
Figure 2:
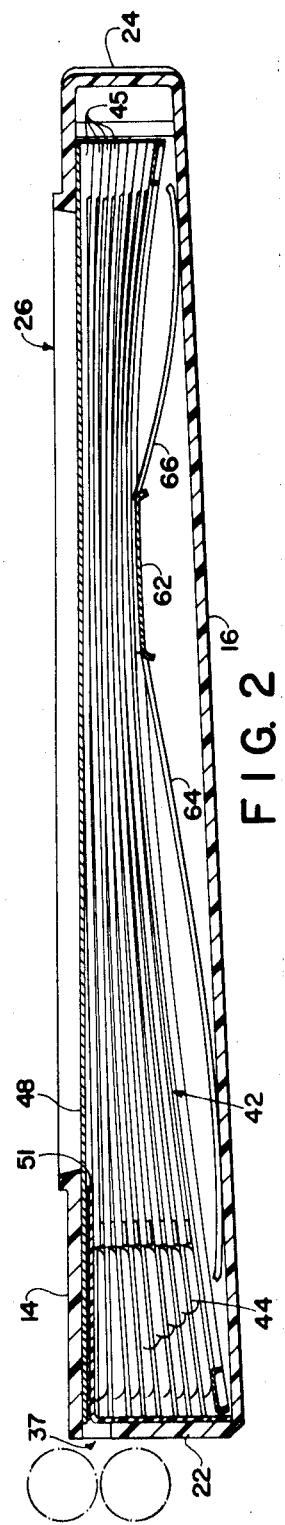
FIG. 2 is a side view, partly in section, of the film assemblage shown in FIG. 1 with the end wall shown in the closed position.

Reference is now made to FIGS. 1 and 2 of the drawings wherein is illustrated the film assemblage or pack of the instant invention denoted generally be reference numeral 10. Film assemblage 10 includes a container 12, made from any suitable opaque material, having a forward wall 14, a rear wall 16, sidewalls 18, 20 and end walls 22, 24. Forward wall 14 has a light-transmitting section or exposure aperture 26 and an elongated slot 28 therein for receiving means for moving a film unit from the container 12. End wall 22, which is shown in FIG. 1 in a position just prior to its being folded 90° against the ends of walls 18 and 20 and sealed thereto, is attached to the rear wall 16 by integral hinge means comprised of a plurality of sections 30 interrupted by narrow elongated openings 32, said openings being sealed after the wall has been moved to the position shown in FIG. 2. In the folded position, end wall 22 fits within recessed portions 34 in the ends of sidewalls 18, 20 and edge 36 of wall 22 cooperates with an end of forward wall 14 to define a withdrawal slot 37 through which a film unit may be moved subsequent to exposure. End wall 22 further includes as an integral part thereof an extension 38 which extends from edge 36 partly across the withdrawal slot 37 to prevent the movement of more than one film unit at a time through said withdrawal slot. Extension 38 is provided with a slit 40 along each side thereof to increase its resiliency.

Positioned within the container 12 are a plurality of film units 42, only two of which are shown in FIG. 1, of the type shown and described in the U.S. Pat. applications of Edwin H. Land, Ser. No. 622,287 and Edwin H. Land et al., Ser. No. 622,286, both filed March 10, 1967. Film units of this type each include all of the materials necessary to produce a positive photographic print including a photosensitive element, an image-receiving element which is transparent and is secured in face-to-face relation with the photosensitive element and a rupturable container 44 of processing liquid secured to the leading end of the photosensitive and image-receiving elements for dispensing its liquid contents therebetween in response to the application of compressive pressure to the container 44. Each film unit is adapted to be processed by advancing the film unit, container 44 foremost, between a pair of pressure-applying members, e.g., rolls, which dispense the liquid contents of the container 44 therefrom between the photosensitive and image-receiving elements and spread the liquid between and in contact with the two elements toward the trailing edge thereof. Each film unit is provided near one lateral edge thereof with a plurality of apertures (not shown), some of which are in alignment with slot 28, which are adapted to receive means positioned in the camera or other apparatus for cooperating with the apertures to move the film unit from the container 12 via the aforementioned withdrawal slot 37. At this point it should be noted that the thickness of each film unit varies from the leading end, i.e., the end having container 44, toward the trailing end. The leading end of the film unit is of maximum thickness because of container 44; the trailing end is of an intermediate thickness due in part to the traps 45 provided thereat to collect any surplus processing liquid; and the portion therebetween including the exposure area is of a minimum thickness. Accordingly, the end of container 12 having withdrawal opening 37 is of a greater thickness or depth than the opposite end of the container, i.e., the container is tapered with walls 14, 16 converging toward wall 24.

Positioned between the forwardmost film unit 42 (the top film unit as viewed in FIG. 2) and the forward wall 14 is an opaque safety cover comprised of a first section of relatively rigid material 48 which is substantially coextensive with wall 14 and a second section 50 formed from any suitable, light opaque, flexible material, e.g., polyethylene. Section 48 is provided with a plurality of apertures 46 for receiving means for moving the safety cover through opening 37. In the embodiment shown in FIGS. 1 and 2, flexible section 50 is secured by any suitable means, e.g., an adhesive, to section 48 at a point beginning at edge 51 and commencing forwardly (to the left as viewed in FIG. 2). Section 50 extends across slot 28, apertures 46 and withdrawal opening 37 to prevent the admission of actinic light therethrough. As can be seen in FIG. 2, the portion of section 50 which is adjacent end wall 22 is retained against wall 22 by the leading edge portions of the film units.

Positioned between the wall 16 and the film unit located adjacent wall 16 is a support member in the form of a platenlike member 52 for supporting and urging the film units into position for exposure adjacent forward wall 14. Support member 52, which is formed from any suitable resilient material such as spring steel, includes a rectangularly shaped member, surrounding a generally H-shaped member comprised of an intermediate member 62 having first and second pairs of legs 64, 66 in the form of cantilever springs extending therefrom. Intermediate member 62 includes depressed portions near its ends for locating it in a plane spaced from a plane containing said rectangularly shaped member in order to insure that no portion of support member 52 comes into contact with a medial portion of a film unit. It should be understood that the means for supporting and urging the film units into position for exposure could comprise a pressure plate and biasing means, such as springs, which would be mounted in the camera and would extend into apertures in rear wall 16 to urge the film units towards wall 14.

After the film assemblage 12 has been positioned within a camera, the means, which may be a reciprocating picklike member, for moving the safety cover is actuated to move the safety cover through opening 37 and into the bite of a pair of rolls (shown in broken lines in FIG. 2) positioned within the camera. As section 48 moves to the left (as viewed in FIG. 2) it carries along with it the flexible section or skirt 50, which due to its flexibility, can move easily through opening 37. Since the leading end portion of section 48 is unsupported during its passage from opening 37 to the pair of rolls, its stiffness must be sufficient to insure its passage into the bite of the rolls.

Figure 4:
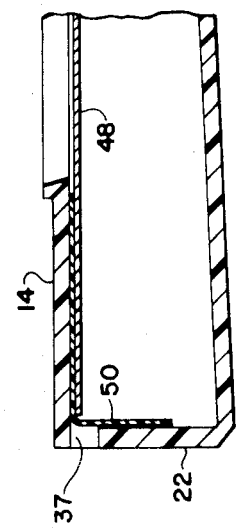
FIG. 4 is a view, partly in section, of still a further embodiment of the instant invention.
Figure 3:
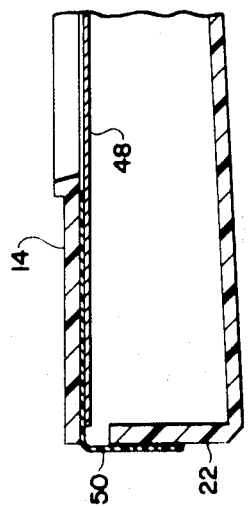
FIG. 3 is a view, partly in section, showing another embodiment of the instant invention.

FIG. 3 shows a modification of the embodiment shown in FIGS. 1 and 2 wherein the flexible skirt is maintained in engagement with the container 12. In this embodiment skirt 50 has one end secured to the exterior surface of end wall 22 and its other end is retained against forward wall 14 by section 48 and the film units under the urging of resilient support member 52. Alternatively, one of the ends of skirt 50 could be secured to the exterior surface of end wall 22, as shown in FIG. 4. It is to be understood that in the embodiments shown in FIGS. 3 and 4, there will be provided sufficient space between opening 37 and the processing rolls of the apparatus to allow separation of skirt 50 from member 48 before member 48 enters the bite of the rolls.

From the foregoing it is apparent that there has been disclosed a novel, inexpensive and efficient film assemblage including a container having a forward wall with a light-transmitting section therein and a withdrawal opening in one end of the container and means to prevent the admission of actinic light through the light-transmitting section and the opening to inadvertently expose film units positioned therein.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising, in combination:
   a container having an end wall defining at least one side of a withdrawal opening dimensioned to permit the passage of film units therethrough and a forward wall having a light-transmitting section therein;
   a plurality of film units arranged in stacked relation within said container with an edge of the foremost of said film units located adjacent and in alignment with said withdrawal opening in position to move therethrough;
   means for supporting said foremost film unit against said forward wall across said light-transmitting section in position for exposure to light transmitted therethrough;
   a first, light-opaque cover element for preventing the admission of actinic light through said light-transmitting section, said first cover element being larger than said light-transmitting section, being positioned between said foremost film unit and said forward wall and being dimensioned for movement through said withdrawal opening; and
   a second, light-opaque cover element for preventing the admission of actinic light through said withdrawal opening, said cover element having a width at least equal to the width of said withdrawal opening, having one end secured to said first cover element and being arranged with its other end extending across said withdrawal opening and retained against said end wall.

2. A photographic film assemblage as defined in claim 1 wherein first cover element is a relatively inflexible sheet and said second cover element is a relatively flexible sheet.

3. A photographic film assemblage as defined in claim 2 wherein said first cover element includes a leading edge portion positioned adjacent and in alignment with said withdrawal opening and said second cover element is secured to said leading edge portion and extends rearwardly across said withdrawal opening.

4. A photographic film assemblage as defined in claim 3 wherein said second cover element is in the form of a skirt secured to said leading edge portion of said first cover element.

5. A photographic film assemblage as defined in claim 3 wherein said other end of said second cover element is releasably secured to said end wall.

6. A photographic film assemblage as defined in claim 3 wherein said film units each include leading edges located against said end wall and said other end of said second cover element is engaged between said end wall and said leading edges of said film units.

7. A photographic film assemblage as defined in claim 2 wherein said forward wall includes a slot therein for admitting the film engaging means of a camera and said first cover element includes receiving means for cooperating with the film engaging means to advance said first and second cover elements through said withdrawal opening.

8. A photographic film assemblage as defined in claim 7 wherein said receiving means comprise at least an aperture in said first cover element aligned with said slot in said forward wall, and said one end of said second cover element extends across said apertures to prevent admission of actinic light therethrough.